US008629375B2

(12) United States Patent
Pinto, IV et al.

(10) Patent No.: US 8,629,375 B2
(45) Date of Patent: Jan. 14, 2014

(54) SELF-ACTUATED DEFOGGER SYSTEM

(75) Inventors: Nicholas W. Pinto, IV, Ferndale, MI (US); Paul W. Alexander, Ypsilanti, MI (US); Nancy L. Johnson, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 160 days.

(21) Appl. No.: 13/198,772

(22) Filed: Aug. 5, 2011

(65) Prior Publication Data

US 2013/0032584 A1 Feb. 7, 2013

(51) Int. Cl.
*B60L 1/02* (2006.01)
*F24H 3/02* (2006.01)

(52) U.S. Cl.
USPC ........... 219/203; 219/202; 219/200; 219/213; 219/214; 219/218; 392/379; 239/128; 239/135; 239/130; 134/198

(58) Field of Classification Search
USPC ......... 219/203, 202, 200, 213–4, 218–9, 492, 219/505, 530, 540; 392/379; 239/128, 135, 239/284.1, 130; 134/198
See application file for complete search history.

(56) References Cited

U.S. PATENT DOCUMENTS 4,673,797 A * 6/1987 Weirick ........................ 219/203
2008/0125941 A1* 5/2008 Mitteer ........................... 701/46

* cited by examiner

*Primary Examiner* — Shawntina Fuqua
(74) *Attorney, Agent, or Firm* — Quinn Law Group, PLLC

(57) ABSTRACT

A defogger system includes structure defining a window or a mirror, a heating element operatively connected to the structure to selectively apply heat to the structure, and a source of electrical energy. The defogger system also includes a switch and an electrically conductive path from the source of electrical energy to the heating element. The switch includes an active material member, and is configured such that the switch interrupts the electrically conductive path when the active material member is above a predetermined temperature. The switch is also configured such that the switch does not interrupt the electrically conductive path when the active material member is below the predetermined temperature.

20 Claims, 3 Drawing Sheets

SELF-ACTUATED DEFOGGER SYSTEM

TECHNICAL FIELD

This invention relates to defoggers for windows and mirrors in vehicles.

BACKGROUND

Vehicles typically include defoggers to remove fog and frost from vehicle surfaces such as windows and mirrors. A defogger system for a windshield typically directs warm air from the vehicle's heating, ventilating, and air conditioning system (HVAC) onto the windshield to remove fog or melt frost. Other vehicle surfaces, such as rear windows and side mirrors, are typically located in positions in which the use of the HVAC system is not feasible. Accordingly, defogger systems for surfaces such as rear windows and side mirrors typically include electrically resistive heating elements mounted to the surfaces to remove fog or melt frost.

A typical defogger system includes a button or other input device located within the vehicle's passenger compartment. The defogger system is activated only after a driver or passenger of the vehicle depresses the button. The typical defogger system includes a timer that automatically deactivates the defogger system after a predetermined amount of time has elapsed since the button was depressed.

SUMMARY

A defogger system includes structure defining a window or a mirror, a heating element operatively connected to the structure to selectively apply heat to the structure, and a source of electrical energy. The defogger system also includes a switch and an electrically conductive path from the source of electrical energy to the heating element. The switch includes an active material member, and is configured such that the switch interrupts the electrically conductive path when the active material member is above a predetermined temperature. The switch is also configured such that the switch does not interrupt the electrically conductive path when the active material member is below the predetermined temperature.

Accordingly, if the predetermined temperature is at or about the temperature at which fog or frost typically forms on a surface, then the defogger system will automatically activate to remove fog or frost from the surface, i.e., a driver may not need to manually activate the defogger system. Similarly, the defogger system will automatically turn off when the temperature of the active material member exceeds the temperature at which fog or frost is likely. Accordingly, the defogger system will automatically turn off once the fog or frost has been removed, unlike timer-based systems, which may remain on longer than necessary or turn off too soon, requiring the driver to manually reactivate the defogger system.

The above features and advantages and other features and advantages of the present invention are readily apparent from the following detailed description of the best modes for carrying out the invention when taken in connection with the accompanying drawings.

DETAILED DESCRIPTION

Figure 1:
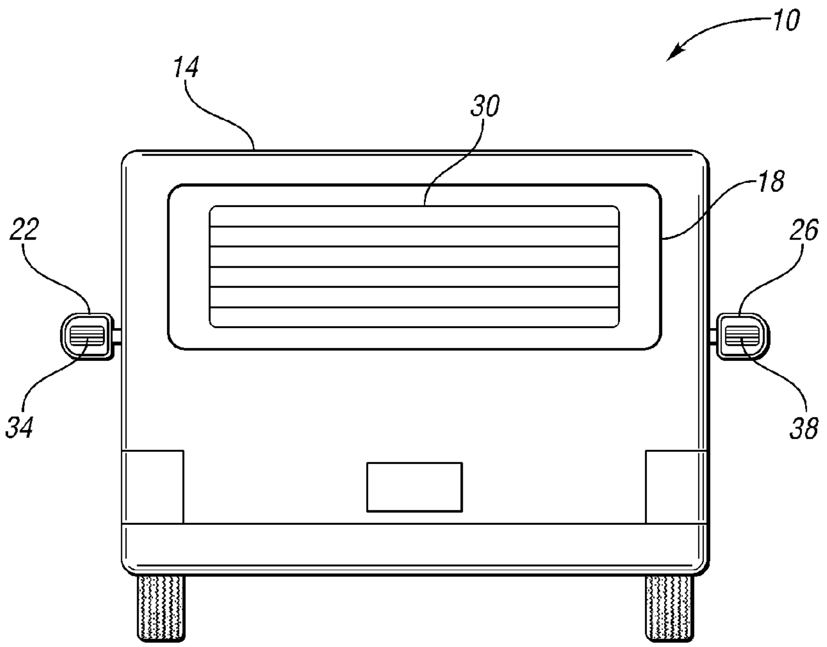
FIG. 1 is a schematic, rear view of a vehicle body including defogger systems.

Referring to FIG. 1, a vehicle 10 includes a vehicle body 14. The vehicle body 14 includes glass windows, including a windshield and rear window 18. The vehicle body 14 also includes a plurality of mirrors, including two side door-mounted rear view mirrors 22, 26. The surfaces of windows 18 and mirrors 22, 26 may, under certain conditions, be obscured by fog (i.e., water condensation) or frost. Accordingly, the rear window 18 and the mirrors 22, 26 each include a respective electronic defogger system 30, 34, 38 to remove fog or frost.

Figure 2:
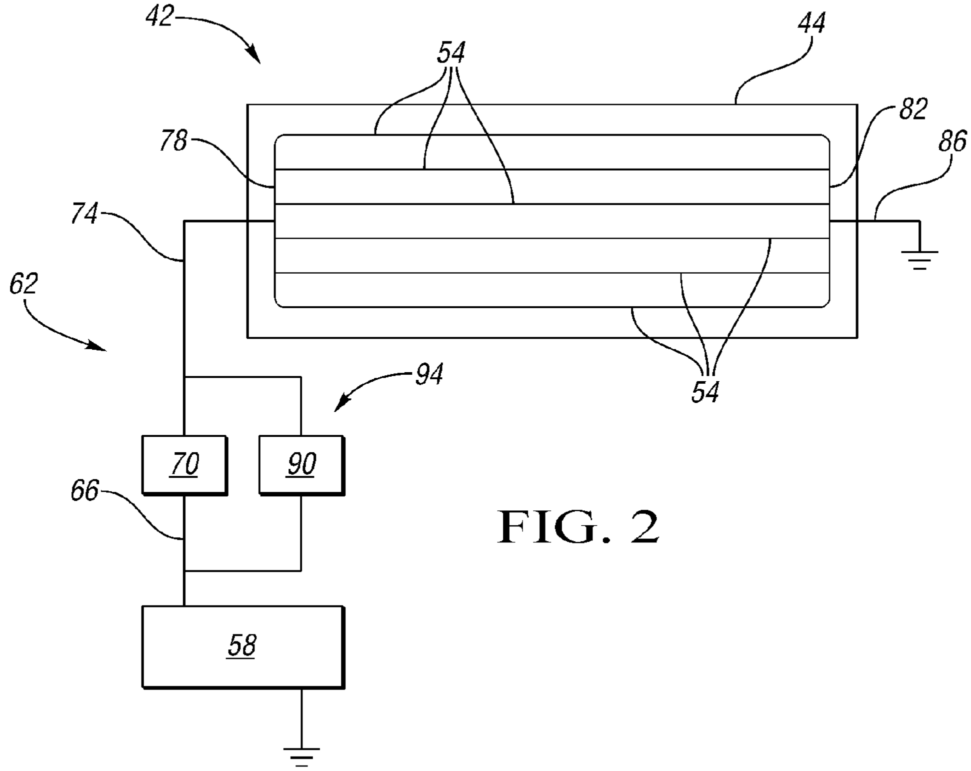
FIG. 2 is a schematic view of a defogger system that is representative of the defogger systems of FIG. 1.

Referring to FIG. 2, a defogger system 42 is schematically depicted. The defogger system 42 is representative of defogger systems 30, 34, 38. Structure 44 may be a vehicle window, such as a windshield, rear window, etc. Structure 44 may also be a vehicle mirror. Accordingly, structure 44 is representative of window 18 and mirrors 22, 26. The defogger system 42 includes at least one electrical resistance heating element 54 that is operatively connected to the structure 44 to selectively apply heat to the structure.

In the embodiment depicted, the defogger system 42 includes a plurality of electrical resistance heating elements 54 mounted directly to a surface of the structure 44 such that they are evenly-spaced and parallel to one another. The heating elements 54 may, for example, be silver-ceramic material printed and baked onto the surface of the structure 44. Alternatively, the heating elements 54 may be very fine wires embedded within the structure. Other heating element configurations may be employed within the scope of the claimed invention. The defogger system 42 includes a source of electrical energy, such as a battery 58. The battery 58 may, for example, be the vehicle battery 58 used for starting the engine (not shown) of the vehicle 10.

An electrically conductive path 62 provides selective electrical communication from the battery 58 to the heating elements 54. In the embodiment depicted, the electrically conductive path 62 includes a first portion 66 that provides electrical communication between the battery 58 and an active material-based switch 70. A second portion 74 of the electrically conductive path 62 provides electrical communication from the switch 70 to a third portion 78 of the electrically conductive path 62. The third portion 78 is connected to each of the electrically resistive heating elements 54 such that the heating elements 54 are electrically connected in parallel. A conductive member 82 connects the heating elements 54 in parallel to ground 86. Portion 78 and member 82 may, for example, be electrically resistive heating elements.

A manually-operated switch 90 is connected in parallel with the switch 70 to the first and second portions 66, 74 and is part of another electrically conductive path 94 from the battery 58 to the heating elements 54. The electrically conductive path 94 is partially coextensive with electrically conductive path 62. The manually-operated switch 90 may be disposed in the passenger compartment of the vehicle body 14 so that a driver of the vehicle 10 can manually operate the defogger system 42 even if switch 70 is open.

The active material-based switch 70 is configured to automatically provide electrical energy from the battery 58 to the heating elements 54 via the electrically conductive path 62 when at least one of the vehicle environmental conditions is indicative of the presence of fog or frost on the structure 44. The switch 70 is also configured to automatically interrupt the flow of electrical energy through the electrically conductive path 62 from the battery 58 to the heating elements 54 when the vehicle environmental operating conditions indicate that the presence of fog or frost on the structure 44 is unlikely More particularly, the defogger system 42 is configured to automatically heat the structure 44 to remove fog or frost when the temperature is such that fog or frost is likely to form, and to automatically turn off when the temperature indicates that the defogger system 42 has sufficiently heated the structure 44 to remove the fog or frost.

Figure 3:
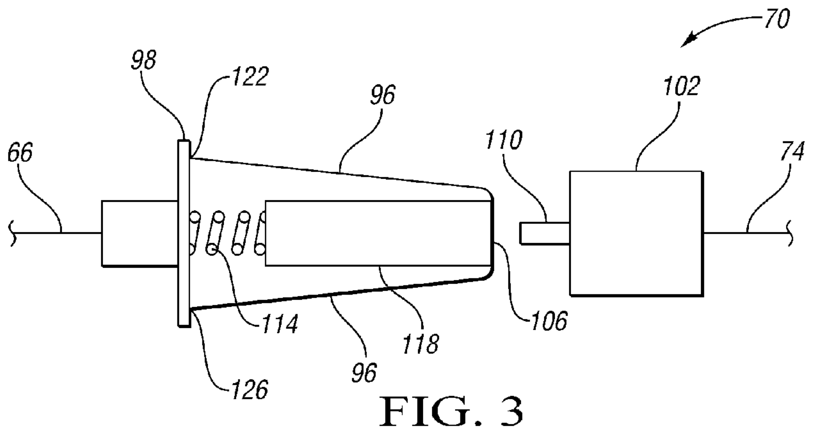
FIG. 3 is a schematic view of an active material-based switch in an open position for use with the defogger system of FIG. 2
Figure 4:
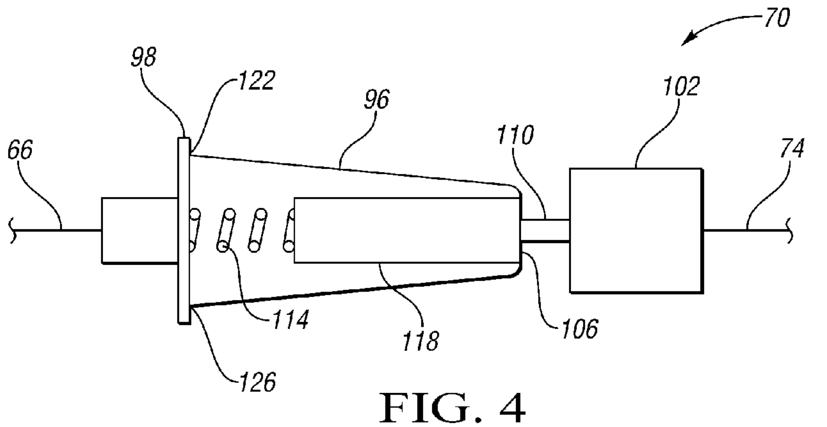
FIG. 4 is a schematic view of the switch of FIG. 3 in a closed position.

FIGS. 3 and 4 schematically depict one embodiment of an active material-based switch 70. Referring to FIG. 3, the switch 70 includes an active material member, i.e. a shape memory alloy (SMA) wire 96. The switch 70 also includes a first stationary (with respect to the vehicle body 14) member 98 and a second stationary (with respect to the vehicle body 14) member 102. The switch 70 also includes a first electrical contact 106, a second electrical contact 110, a spring 114, and a plunger member 118.

The SMA wire 96 includes a first end 122 and a second end 126, both of which are connected to the first stationary member 98. In the embodiment of FIGS. 3 and 4, the first electrical contact 106 is a portion of the SMA wire 96. More specifically, the first electrical contact 106 is the portion of the SMA wire 96 that is most distant from the first stationary member 98 and most proximate to the second electrical contact 110 and the second stationary member 102. The plunger member 118 is in contact with the first electrical contact 106. The spring 114 contacts the first stationary member 98 and the plunger member 118. The spring 114 is compressed between the plunger member 118 and the first stationary member 98, and thus the spring 114 biases the plunger member 118 and the first electrical contact 106 toward the second electrical contact 110. Accordingly, the spring 114 also applies tensile stress to the SMA wire 96.

The SMA wire 96, including the first electrical contact 106, is in electrical communication with the first portion 66 of the conductive path 62 and, correspondingly, with the battery 58. The second electrical contact 110 is mounted with respect to the second stationary member 102 and is in electrical communication with the second portion 74 of the conductive path 62 and, correspondingly, with the heating elements 54.

The first electrical contact 106 is selectively movable between a first position, as shown in FIG. 3, and a second position, as shown in FIG. 4. Referring specifically to FIG. 3, in the first position, the first electrical contact 106 is spaced apart from, and does not contact, the second electrical contact 110, and thus the switch 70 interrupts the conductive path 62, thereby preventing the flow of electrical energy from the battery 58 to the heating elements 54 through the conductive path 62 (although electrical energy may still flow from the battery 58 to the heating elements 54 through the other conductive path 94, depending on the state of the manually-operated switch 90).

Referring specifically to FIG. 4, in the second position, the first electrical contact 106 contacts the second electrical contact 110, and thus the switch 70 does not interrupt the conductive path 62, thereby permitting the flow of electrical energy from the battery 58 to the heating elements 54. More specifically, when the first electrical contact 106 contacts the second electrical contact 110, the battery 58 is in electrical communication with the heating elements 54 via the first portion 66, member 98, SMA wire 96 (including contact 106), contact 110, member 102, portion 74, and portion 78.

A shape memory alloy is characterized by a cold state, i.e., when the temperature of the alloy is below its martensite finish temperature $M_f$. A shape memory alloy is also characterized by a hot state, i.e., when the temperature of the alloy is above its austenite finish temperature $A_f$. An object formed of the alloy may be characterized by a predetermined shape. When the object is pseudo-plastically deformed from its predetermined shape in the cold state, the strain may be reversed by heating the object above its austenite finish temperature $A_f$, i.e., heating the object above its $A_f$ will cause the object to return to its predetermined shape. An SMA's modulus of elasticity and yield strength are also significantly lower in the cold state than in the hot state. As understood by those skilled in the art, pseudo-plastic strain is similar to plastic strain in that the strain persists despite removal of the stress that caused the strain. However, unlike plastic strain, pseudo-plastic strain is reversible when the object is heated to its hot state.

Referring again to FIG. 3, the SMA wire 96 is shown in the hot state and in a predetermined first length (shape). The first length is short enough to prevent the first electrical contact 106 from contacting the second electrical contact 110. The spring 114 exerts a tensile stress on the SMA wire 96, but the modulus of the SMA wire 96 in the hot state is sufficiently high to prevent significant strain in the SMA wire 96 as a result of the spring-induced stress. Thus the first electrical contact 106 does not contact the second electrical contact 110, and the switch 70 is open, so long as the temperature of the SMA wire 96 remains above a predetermined temperature. The SMA wire 96 changes from the hot state to the cold state at the predetermined temperature.

When the SMA wire 96 is below the predetermined temperature, it enters the cold state. In the cold state, the modulus of the SMA wire 96 is lower than in the hot state, and thus the tensile strain of the SMA wire 96 (as a result of the stress applied by the spring 114) is greater than in the hot state. Referring again to FIG. 4, the SMA wire 96 is in the cold state, and the spring 114 has strained the SMA wire 96 sufficiently to move the first electrical contact 106 into contact with the second electrical contact 110. The strained SMA wire 96 in the cold state is characterized by a second length (shape) greater than the first length.

Accordingly, so long as the temperature of the SMA wire 96 remains below the predetermined temperature, the first electrical contact 106 is in contact with the second electrical contact 110, and the switch 70 remains closed. Once the SMA wire 96 is again heated to the hot state, the tensile strain in the SMA wire 96 is reversed, and the SMA wire 96 returns to the first length, as shown in FIG. 3, thereby drawing the first electrical contact 106 away from the second electrical contact 110 to the first position.

The SMA wire 96 is configured such that the martensite finish temperature and the austenite finish temperature, i.e., the predetermined temperature, are approximately 35 degrees Fahrenheit, which is a temperature at or below which frost or fog formation is likely. Accordingly, the switch 70 includes an active material member, i.e. wire 96, that is configured such that the switch 70 interrupts the electrically conductive path 62 when the active material member is above a predetermined temperature, and such that the switch 70 does not interrupt the electrically conductive path 62 when the active material member is below the predetermined temperature. More specifically, the active material member, i.e., SMA wire 96, is configured to automatically assume a first shape, as shown in FIG. 3, when the active material member is above the predetermined temperature, and the switch 70 is configured such that the active material member assumes a second shape, as shown in FIG. 4, when the active material member is below the predetermined temperature.

The active material member, i.e., SMA wire 96, is operatively connected to the first electrical contact 106 such that the first electrical contact 106 contacts the second electrical contact 110 when the active material member has assumed the second shape, as shown in FIG. 4. The first electrical contact 106 does not contact the second electrical contact 110 when the active material member has assumed the first shape, as shown in FIG. 3. The spring 114 biases the first electrical contact 106 into contact with the second electrical contact 110.

Figure 5:
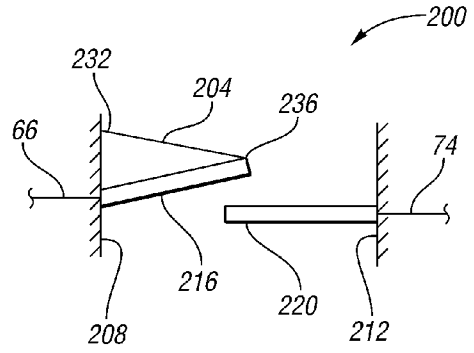
FIG. 5 is a schematic view of another active material-based switch in an open position for use with the defogger system of FIG. 2.
Figure 6:
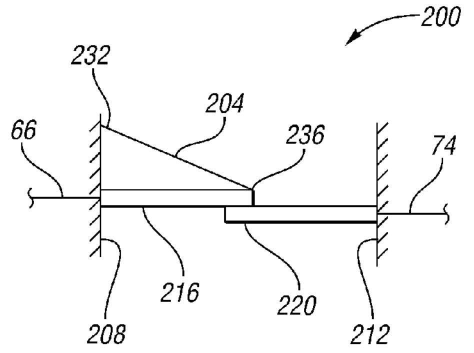
FIG. 6 is a schematic view of the switch of FIG. 5 in a closed position.

FIGS. 5 and 6 schematically depict another embodiment of an active material-based switch 200 that may be used in place of switch 70 in the defogger system 42 of FIG. 2. Referring to FIGS. 5 and 6, the switch 200 includes an active material member, i.e. a shape memory alloy (SMA) wire 204. The switch 200 also includes a first stationary (with respect to the vehicle body 14) member 208 and a second stationary (with respect to the vehicle body 14) member 212. The switch 200 also includes a first electrical contact 216 and a second electrical contact 220.

The SMA wire 204 includes a first end 232 and a second end 236. The first end 232 is mounted with respect to the first stationary member 208. The second end 236 is mounted with respect to the first electrical contact 216. The first electrical contact 216 is mounted to the first stationary member 208 in a cantilever fashion, and is in electrical communication with the first portion 66 of the conductive path 62 and, correspondingly, with the battery 58. The second electrical contact 220 is mounted with respect to the second stationary member 212 and is in electrical communication with the second portion 74 of the conductive path 62 and, correspondingly, with the heating elements 54.

The first electrical contact 216 is selectively movable between a first position, as shown in FIG. 5, and a second position, as shown in FIG. 6. Referring specifically to FIG. 5, in the first position, the first electrical contact 216 is spaced apart from, and does not contact, the second electrical contact 220, and thus the switch 200 interrupts the conductive path 62, thereby preventing the flow of electrical energy from the battery 58 to the heating elements 54 through the conductive path 62 (although electrical energy may still flow from the battery 58 to the heating elements 54 through the other conductive path 94, depending on the state of the manually-operated switch 90).

Referring specifically to FIG. 6, in the second position, the first electrical contact 216 contacts the second electrical contact, and thus the switch 200 does not interrupt the conductive path 200, thereby permitting the flow of electrical energy from the battery 58 to the heating elements 54. More specifically, when the first electrical contact 216 contacts the second electrical contact 220, the battery 58 is in electrical communication with the heating elements 54 via the first portion 66, member 208, contact 216, contact 220, member 212, portion 74, and portion 78.

Referring again to FIG. 5, the SMA wire 204 is shown in the hot state and is a predetermined first length (shape). The first length is short enough to prevent the first electrical contact 216 from contacting the second electrical contact 220. The first electrical contact 216 is moved between the first position and the second position by bending the contact 216. This bending action causes elastic strain in the first electrical contact 216 when the first electrical contact 216 is in the first position. Accordingly, the first electrical contact 216 acts as a spring that exerts a tensile stress on the SMA wire 204, but the modulus of the SMA wire 204 in the hot state is sufficiently high to prevent significant strain as a result of the spring-induced stress. Thus the first electrical contact 216 does not contact the second electrical contact 220, and the switch 200 is open, so long as the temperature of the SMA wire 204 remains above the predetermined temperature. In other words, the SMA wire 204 maintains the elastic strain of the first electrical contact 206, thereby preventing the first electrical contact 216 from returning to the second position.

When the SMA wire 204 is below the predetermined temperature, it enters the cold state. In the cold state, the modulus of the SMA wire 204 is lower than in the hot state, and thus the tensile strain of the SMA wire 204 (as a result of the stress applied by the first electrical contact 216) is greater than in the hot state. Referring again to FIG. 6, the SMA wire 204 is in the cold state, and the first electrical contact 216 has strained the SMA wire 204 sufficiently to permit movement of the first electrical contact 216 into contact with the second electrical contact 220. The strained SMA wire 204 in the cold state is characterized by a second length (shape) greater than the first length.

Accordingly, so long as the temperature of the SMA wire 204 remains below the predetermined temperature, the first electrical contact 216 is in contact with the second electrical contact 220, and the switch 200 remains closed. Once the SMA wire 204 is again heated to the hot state, the tensile strain is reversed, and the SMA wire 204 returns to the first length, as shown in FIG. 5, thereby drawing the first electrical contact 216 away from the second electrical contact 220 to the first position.

Accordingly, the switch 200 includes an active material member, i.e. wire 204, that is configured such that the switch 200 interrupts the electrically conductive path 62 when the active material member is above a predetermined temperature, and such that the switch 200 does not interrupt the electrically conductive path 62 when the active material member is below the predetermined temperature. More specifically, the active material member, i.e., SMA wire 204, is configured to automatically assume a first shape, as shown FIG. 5, when the active material member is above the predetermined temperature, and the switch 200 is configured such that the active material member assumes a second shape, as shown in FIG. 6, when the active material member is below the predetermined temperature.

The active material member, i.e., SMA wire 204, is operatively connected to the first electrical contact 216 such that the first electrical contact 216 contacts the second electrical contact 220 when the active material member has assumed the second shape. The first electrical contact 216 does not contact the second electrical contact 220 when the active material member has assumed the first shape. The first electrical contact 216 biases itself into contact with the second electrical contact 220.

Figure 7:
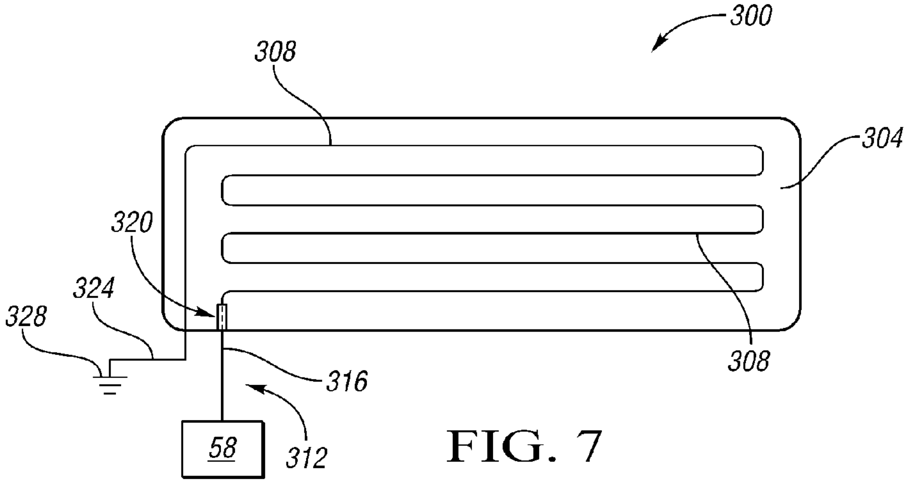
FIG. 7 is a schematic view of another defogger system that may be used with the vehicle of FIG. 1.

Referring to FIG. 7, an alternative defogger system 300 is schematically depicted. The defogger system 300 includes structure 304 that is representative of window 18 and mirrors 22, 26. The defogger system 300 includes at least one electrical resistance heating element 308 that is operatively connected to the structure 304 to selectively apply heat to the structure 304. The defogger system 300 includes an electrical resistance heating element 308 mounted directly to the structure 304. The defogger system 300 includes a source of electrical energy, such as battery 58.

An electrically conductive path 312 provides selective electrical communication from the battery 58 to the heating element 308. In the embodiment depicted, the electrically conductive path 312 includes portion 316 that is in electrical communication with the battery 58. An active material-based switch 320 is operatively connected to portion 316 and the heating element 308. The active material-based switch 320 is configured to automatically provide electrical energy from the battery 58 to the heating element 308 via the electrically conductive path 312 when at least one of the vehicle environmental conditions is indicative of the presence of fog or frost on the structure 304. The switch 320 is also configured to automatically interrupt the flow of electrical energy through the electrically conductive path 312 from the battery 58 to the heating element 308 when the vehicle environmental operating conditions are not indicative of the presence of fog or frost on the structure 304. A conductive member 324 provides electrical communication from the heating element 308 to ground 328.

Figure 8:
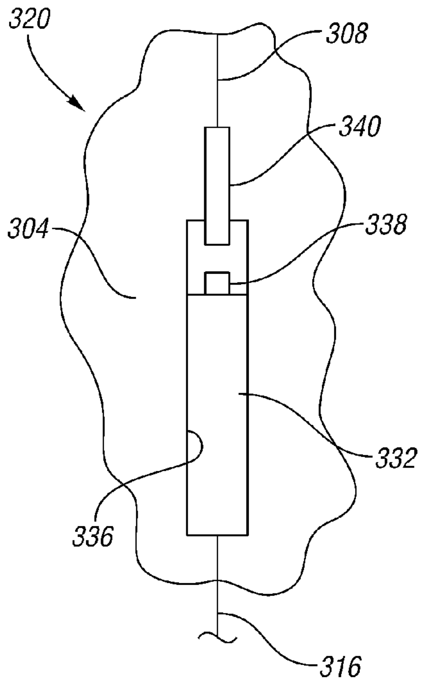
FIG. 8 is a schematic view of an active material-based switch in an open position for use with the defogger system of FIG. 6.
Figure 9:
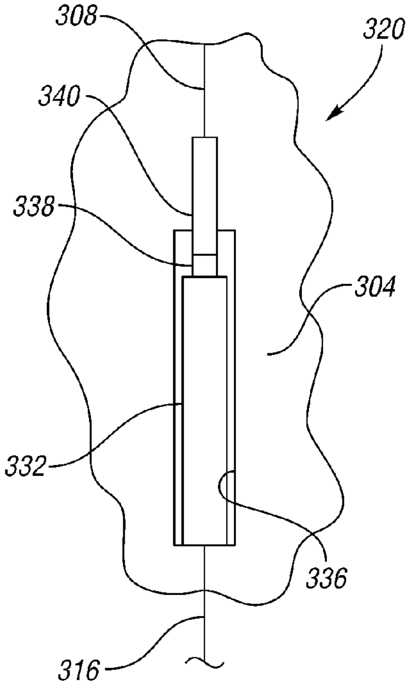
FIG. 9 is a schematic view of the switch of FIG. 7 in a closed position.

Referring to FIGS. 8 and 9, the switch 320 includes an active material member, i.e. a shape memory alloy (SMA) wire 332. The SMA wire 332 is disposed within a groove 336 defined by the structure 304. The switch 320 also includes a first electrical contact 338 and a second electrical contact 340. The SMA wire 332 is connected to the portion 316 of the conductive path 312 at one end, and to the first electrical contact 338 at the other end. Accordingly, the first electrical contact 338 is in electrical communication with portion 66 of the conductive path 312 and, correspondingly, with the battery 58 via the SMA wire 332. The second electrical contact 340 is in electrical communication with the heating element 308. The second electrical contact 340 is at least partially disposed within, or exposed to, the groove 336.

The first electrical contact 338 is selectively movable between a first position, as shown in FIG. 8, and a second position, as shown in FIG. 9. In the first position, the first electrical contact 338 is spaced apart from, and does not contact, the second electrical contact 340, and thus the switch 320 interrupts the conductive path 312, thereby preventing the flow of electrical energy from the battery 58 to the heating element 308 through the conductive path 312. It should be noted, that optionally, electrical energy may still flow from the battery 58 to the heating element 308 through another conductive path (not shown in FIG. 7), such as a manually operable conductive path as shown at 94 in FIG. 2.

In the second position, as shown in FIG. 9, the first electrical contact 338 contacts the second electrical contact 340, and thus the switch 320 does not interrupt the conductive path 312, thereby permitting the flow of electrical energy from the battery 58 to the heating element 308.

The SMA wire 332 is characterized by a predetermined first length (shape) when it is in the hot state, as shown in FIG. 8. The SMA wire 332 is characterized by a second length when it is in the cold state, as shown in FIG. 9. The active material member, i.e., SMA wire 332, is operatively connected to the first electrical contact 338 such that the first electrical contact 338 contacts the second electrical contact 340 when the active material member has assumed the second shape, as shown in FIG. 9. The first electrical contact 338 does not contact the second electrical contact 340 when the active material member has assumed the first shape, as shown in FIG. 8.

The first length is shorter than the second length, and, accordingly, the width of the SMA wire 332 in the hot state is greater than the width of the SMA wire 332 in the cold state. The size of the groove 336 relative to the SMA wire 332 is such that the structure 304, which defines the groove 336, exerts a greater reaction force on the SMA wire 332 when the SMA wire 332 assumes the predetermined first length than when the SMA wire 332 assumes the second length. More specifically, the width of the SMA wire 332 in the hot state is such that the structure 304 exerts a significant reaction force on the SMA wire 332; however, the modulus of the SMA wire 332 in the hot state is sufficiently high to prevent significant deformation of the SMA wire 332 as a result of the reaction force.

When the SMA wire 332 enters the cold state, the modulus of the SMA wire is reduced, and the reaction force causes strain in the wire 332, which causes the SMA wire 332 to elongate until the first electrical contact 338 contacts the second electrical contact 340. Once the temperature of the SMA wire 332 has exceeded the predetermined temperature, then the strain in the SMA wire 332 is reversed and the SMA wire 332 assumes the first shape, thereby drawing the first electrical contact 338 away from the second electrical contact 340.

Since the SMA wire 332 is in contact with the structure 304 (at the walls of the groove 336), the switch 320 provides almost instantaneous temperature feedback. The transition from the hot state to the cold state, and thus the movement of the switch 320 between open and closed positions, will occur almost immediately after the structure 304 reaches the predetermined temperature.

While the best modes for carrying out the invention have been described in detail, those familiar with the art to which this invention relates will recognize various alternative designs and embodiments for practicing the invention within the scope of the appended claims.

The invention claimed is:

1. A defogger system comprising:

structure defining a window or a mirror;

a heating element operatively connected to the structure to selectively apply heat to the structure;

a source of electrical energy;

an electrically conductive path from the source of electrical energy to the heating element; and a switch having an active material member that is configured such that the switch interrupts the electrically conductive path when the active material member is above a predetermined temperature, and such that the switch does not interrupt the electrically conductive path when the active material member is below the predetermined temperature.

2. The defogger system of claim 1, wherein the active material member is configured to automatically assume a first shape when the active material member is above the predetermined temperature; and wherein the switch is configured such that the active material member assumes a second shape when the active material member is below the predetermined temperature.

3. The defogger system of claim 2, wherein the switch includes a first electrical contact and a second electrical contact; and wherein the active material member is operatively connected to the first electrical contact such that the first electrical contact contacts the second electrical contact when the active material member has assumed the second shape, and such that the first electrical contact does not contact the second electrical contact when the active material member has assumed the first shape.

4. The defogger system of claim 3, wherein the switch includes a spring that biases the first electrical contact into contact with the second electrical contact.

5. The defogger system of claim 3, wherein the active material member comprises shape memory alloy.

6. The defogger system of claim 3, wherein active material member is in contact with the structure.

7. The defogger system of claim 6, wherein the structure defines a groove; and wherein the active material member is at least partially disposed within the groove.

8. The defogger system of claim 7, wherein the size of the groove is such that the structure exerts a greater reaction force on the active material member when the active material member assumes the first shape than when the active material member assumes the second shape.

9. The defogger system of claim 8, wherein the active material member comprises shape memory alloy.

10. A vehicle comprising:

an automotive vehicle body including structure;

a source of electrical energy; and a defogger system including a heating element operatively connected to the structure to selectively apply heat to the structure, an electrically conductive path from the source of electrical energy to the heating element, and a switch;

wherein the switch includes an active material member that is configured such that the switch interrupts the electrically conductive path when the active material member is above a predetermined temperature, and such that the switch does not interrupt the electrically conductive path when the active material member is below the predetermined temperature.

11. The vehicle of claim 10, wherein the active material member is configured to automatically assume a first shape when the active material member is above a predetermined temperature; and wherein the switch is configured such that the active material member assumes a second shape when the active material member is below the predetermined temperature.

12. The vehicle of claim 11, wherein the switch includes a first electrical contact and a second electrical contact; and wherein the active material member is operatively connected to the first electrical contact such that the first electrical contact contacts the second electrical contact when the active material member has assumed the second shape, and such that the first electrical contact does not contact the second electrical contact when the active material member has assumed the first shape.

13. The vehicle of claim 12, wherein the switch includes a spring that biases the first electrical contact into contact with the second electrical contact.

14. The vehicle of claim 13, wherein the active material member comprises shape memory alloy.

15. The vehicle of claim 12, wherein active material member is in contact with the structure.

16. The vehicle of claim 15, wherein the structure defines a groove; and wherein the active material member is at least partially disposed within the groove.

17. The vehicle of claim 16, wherein the size of the groove is such that the structure exerts a greater reaction force on the active material member when the active material member assumes the first shape than when the active material member assumes the second shape.

18. The vehicle of claim 17, wherein the active material member comprises shape memory alloy.

19. The vehicle of claim 10, wherein the structure defines a window.

20. The vehicle of claim 10, wherein the structure defines a mirror.

* * * * *